Jan. 5, 1932.   W. F. FRASER   1,840,088
GRINDING MACHINE
Filed May 19, 1928   7 Sheets-Sheet 3

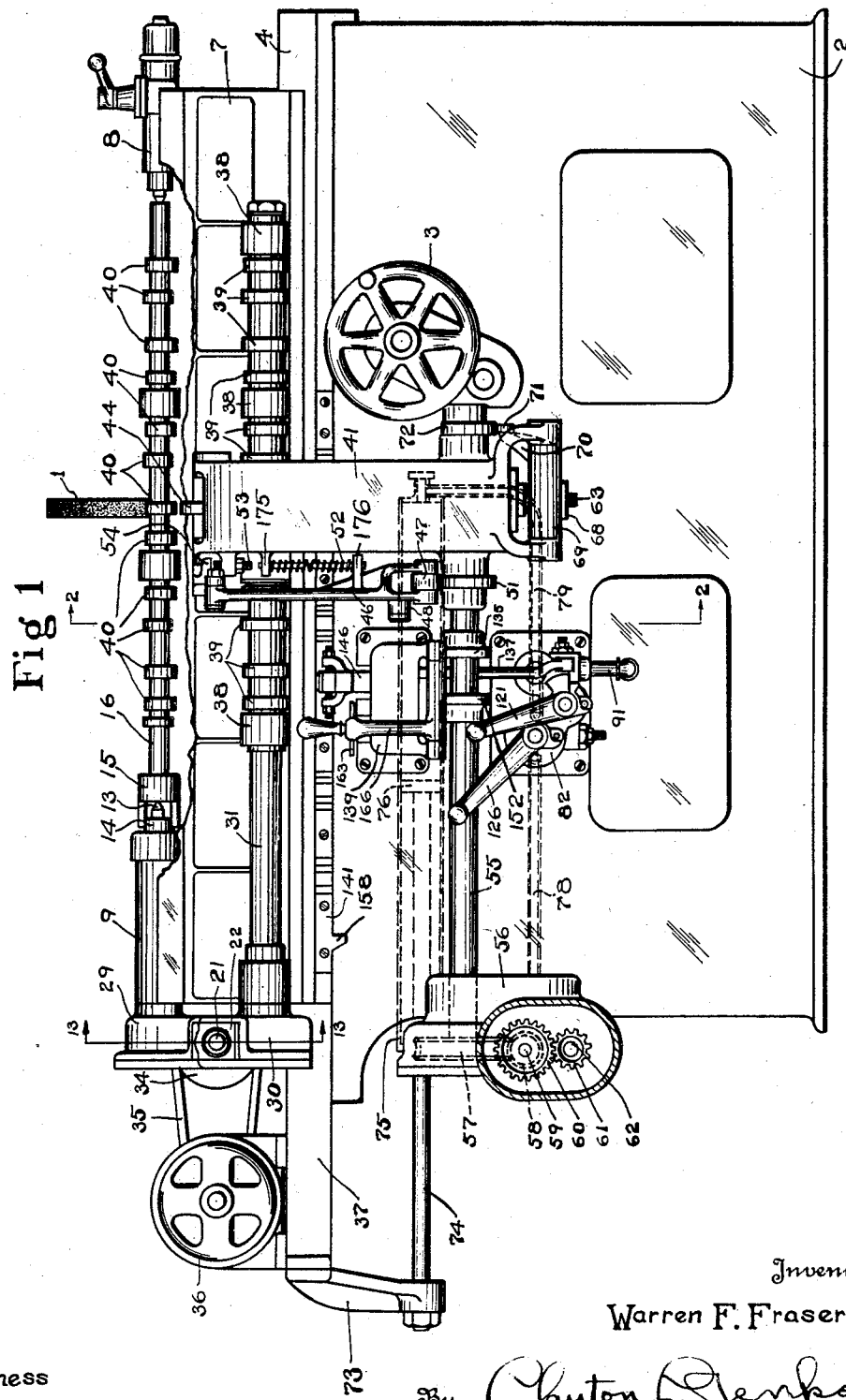

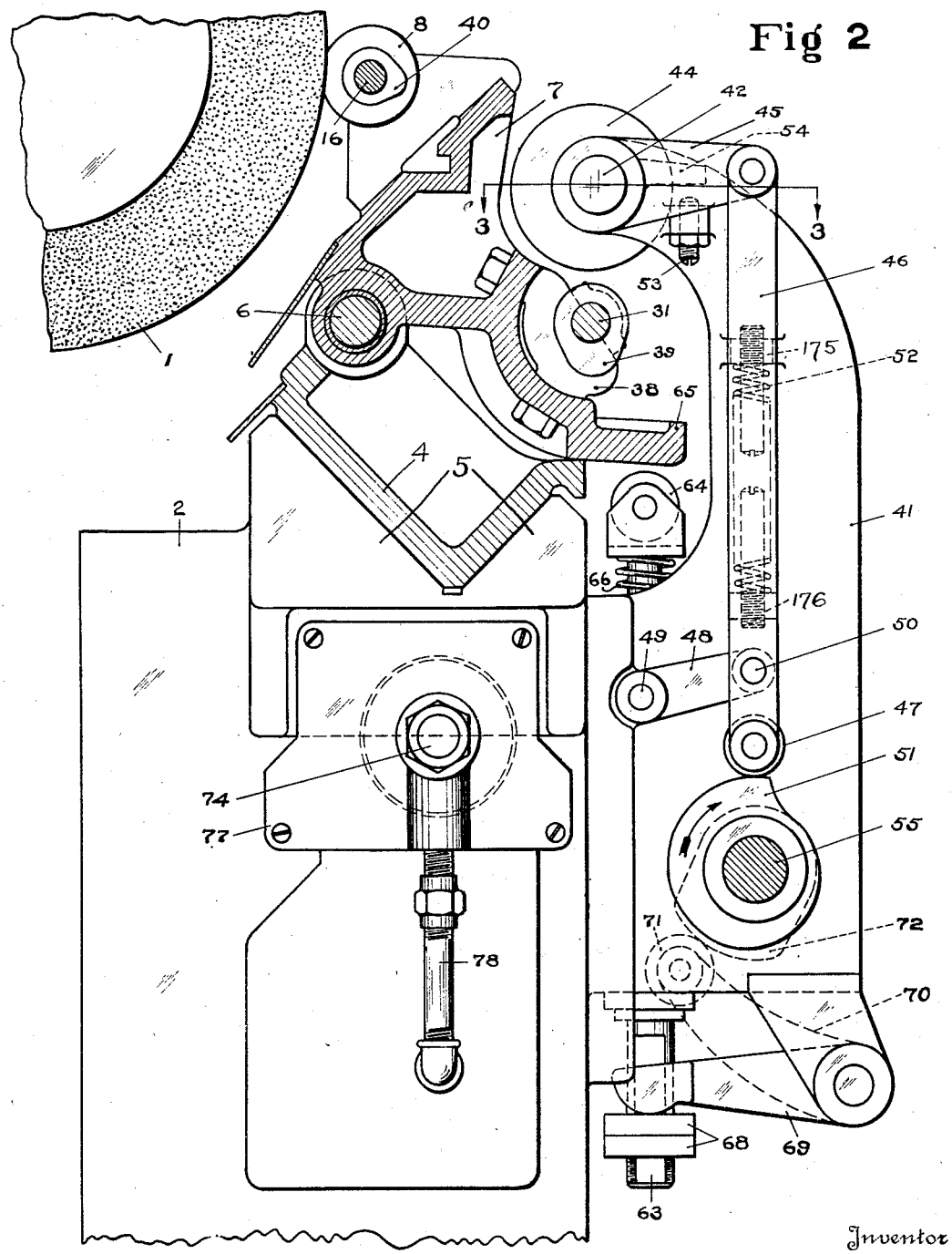

Inventor
Warren F. Fraser
By Clayton H. Jenks
Attorney

Witness

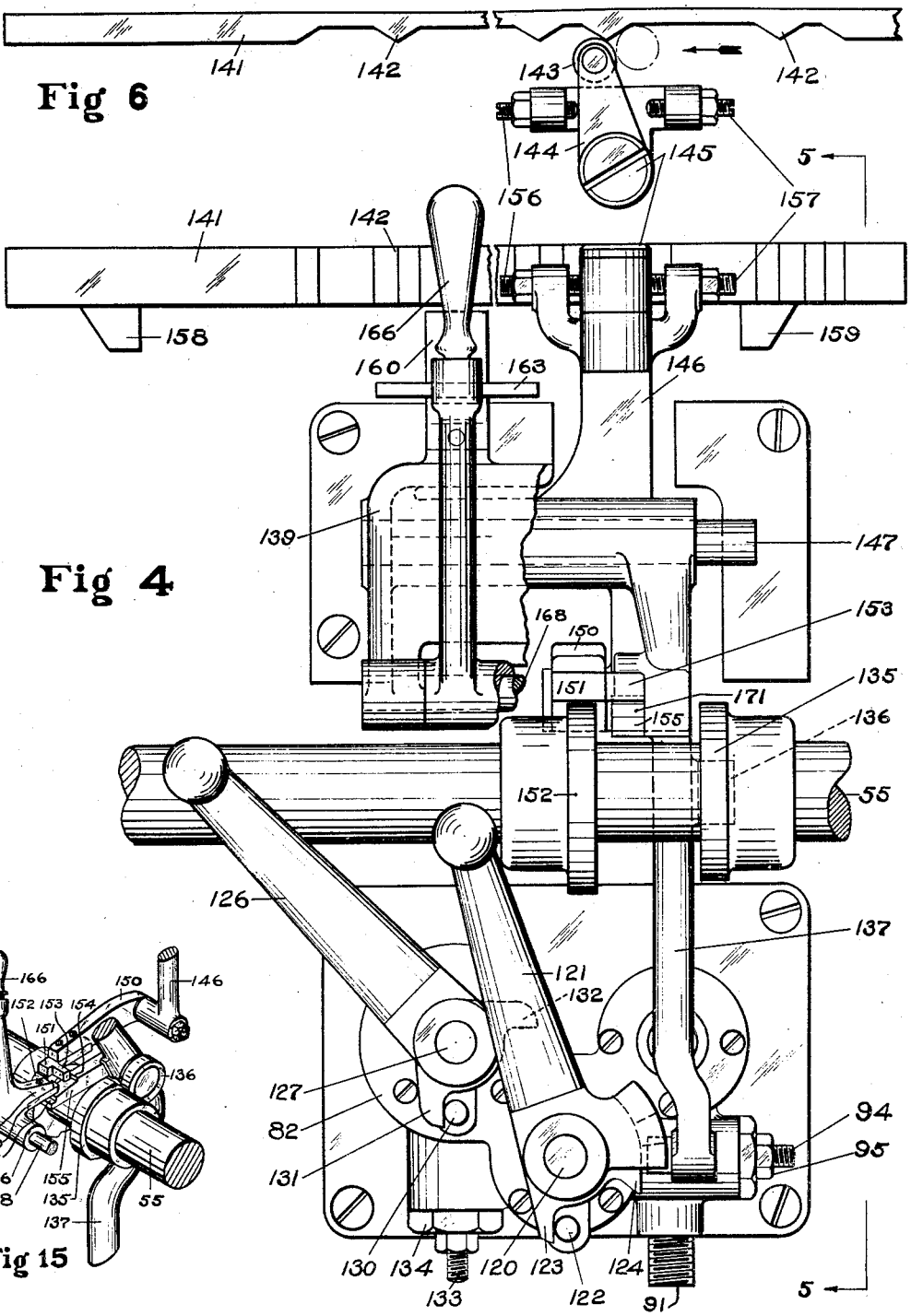

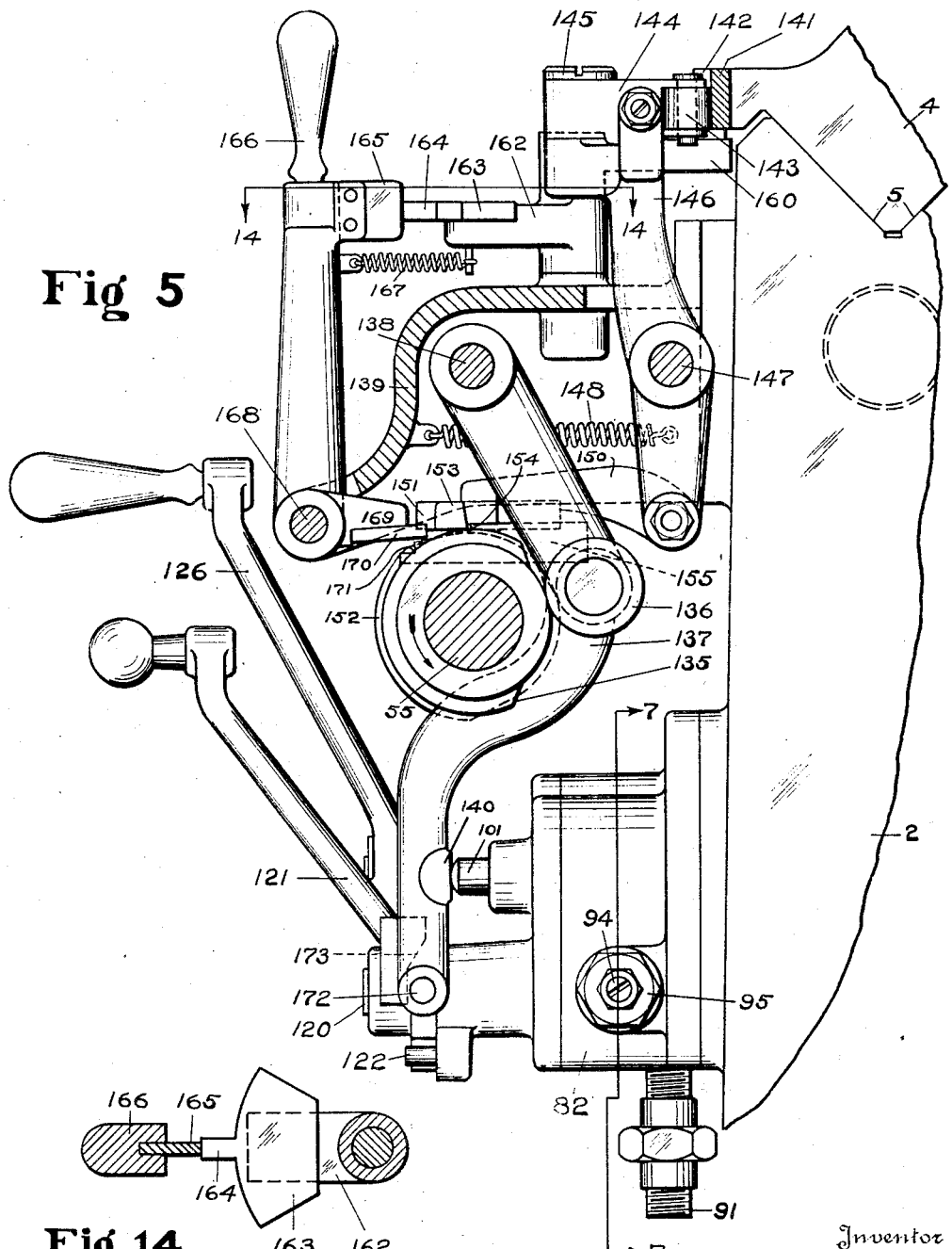

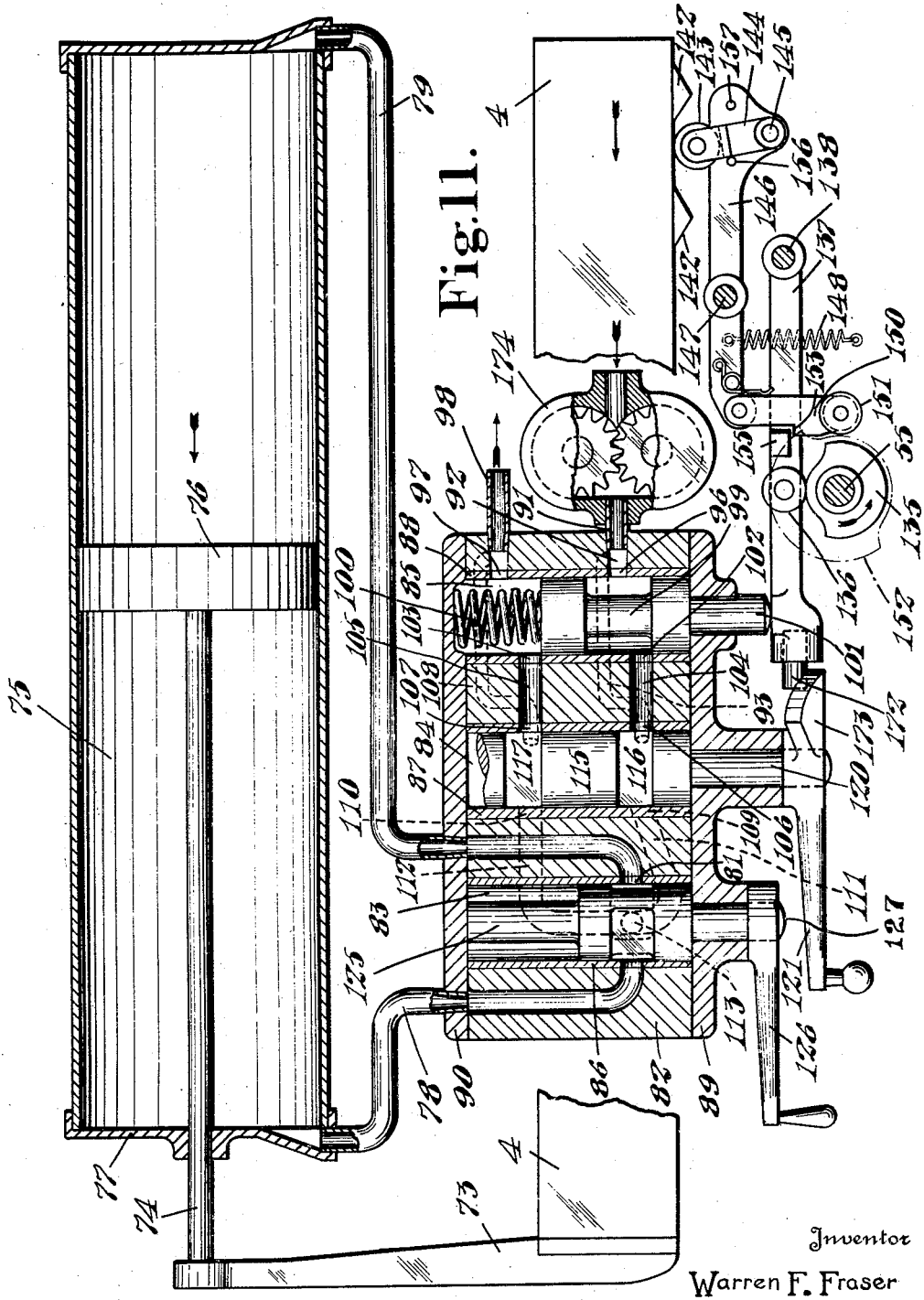

Jan. 5, 1932.    W. F. FRASER    1,840,088
GRINDING MACHINE
Filed May 19, 1928    7 Sheets-Sheet 7

Inventor
Warren F. Fraser

Witness

By

Attorney

Patented Jan. 5, 1932

1,840,088

UNITED STATES PATENT OFFICE

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS

GRINDING MACHINE

Application filed May 19, 1928. Serial No. 279,162.

This invention relates to grinding machines and, while many of its features may be employed advantageously in grinding machines in general, its principal object is to provide a fully automatic machine for grinding a series of longitudinally arranged objects or blanks having a common axis of rotation, such as collars, bearings or cams on a shaft.

In one of its aspects, the present invention consists in a development or a carrying-forward of that type of grinding machine in which the work piece or object to be ground is mounted for rotation on centers and moved transversely relatively to a grinding wheel. The transverse movement is so controlled by means of a master or model form as to reproduce the desired contour in the finished object. This type of machine has been used heretofore in grinding such work pieces as cam shafts for gas engines but in every case the operation of the machine has depended largely upon the attention of a skilled operator for making the requisite relative arrangement of the blank, the model form, the grinding wheel and the form follower. In accordance with the present invention, these functions are performed automatically. The operator has only to mount the work and the master or model properly in the machine and set it in motion, whereupon the complete grinding operation is carried out without the necessity of further supervision. If, for example, a cam shaft is to be ground, the shaft is automatically traversed to bring the first blank in the series into operative position with respect to the grinding wheel, the corresponding model or master cam is brought into operative relation with respect to the master follower roll, the shaft is locked in position while the grinding feed takes place, and upon the completion of the first cam in the series, the shaft is again traversed to present the second blank in position, and so on until the last blank has been completed and the machine automatically brought to rest.

It will be obvious that a machine operating in the manner outlined marks an important advance in the art and is of the highest practical value. To begin with, the operator is relieved from the long and exacting vigil which has been required of him heretofore in grinding a shaft having eight to sixteen cams therein. In the second place, the whole operation may be speeded up inasmuch as the traverse of the work is positively controlled and definitely limited, and correspondence between the blank being ground and the proper master cam is positively assured. Further, the precision of the grinding is improved because each movement of the machine takes place at exactly the same speed and under the same conditions and, finally, the danger of damage to the work is eliminated. This is of extreme importance in dealing with expensive work pieces, such as cam shafts. It will be understood that it is necessary to retract the work piece a considerable distance from its operative relation to the grinding wheel after the surface of one blank has been finished and before the carriage can be safely traversed to present a second blank to the wheel. If this is not done, the wheel comes in contact with the blank to be ground and so damages one or the other. Where this separation of the work piece and the grinding wheel is effected automatically and in fixed time relation to the traverse, as in the machine of the present invention, it will be clear that danger from this source is entirely obviated.

As herein shown, the machine includes actuating means for effecting the carriage traverse and separate actuating means for effecting the intermittent relative approach of the carriage and grinding wheel in grinding the blanks thus presented. An important feature of the invention consists in so controlling these two actuating means that overlapping operation of the two is positively prevented.

In gas engine cam shafts as commonly constructed, the cams are unequally spaced. They are usually grouped in pairs, that is, the intake and exhaust cams for each cylinder are arranged in pairs or groups, and these are unequally spaced in the shaft. An important feature of the present invention consists in automatic mechanism for effecting a traverse of the work piece with respect to the grinding element in unequal steps of predetermined distance to present successively such unequally spaced blanks in grinding position.

It has been stated that in one aspect the present invention consists in a fully automatic grinding machine. However, the invention has been carried a step further and contemplates, as another important feature, an automatic grinding machine so organized that, if desired, the traverse of the work piece may be manually controlled. As herein shown, a single controlling lever is provided which may be set to render inoperative the automatically acting work traversing mechanism and to render the machine susceptible to manual control in this respect. Such provision is useful in adapting the machine for handling work outside of routine production and increases the utility of the machine in a marked degree.

In this connection, still another feature of the invention consists in the provision of separate speed controlling devices, so that the traverse of the work piece effected automatically and the traverse of the work piece under manual control may be best regulated independently and in accordance with the requirements of the work in hand.

The invention is herein shown as embodied in a machine having fluid pressure mechanism for traversing the work piece and, while such construction comprises a satisfactory one for the intended purpose, a mechanical system accomplishing like results would be within the scope of the invention. As herein shown, however, the carriage for supporting the work piece is actuated by connections with a fluid pressure cylinder. In this connection, another feature of the invention consists in the provision of an intermittently acting valve for timing the flow of fluid in the system in accordance with the position of the work piece with respect to the grinding element, that is to say, the valve is timed to effect the traverse of the work piece while the latter is in a position remote from the grinding wheel. The system includes further a valve for controlling the direction of flow so that the traverse may take place in either direction as desired and, finally, the system includes a third valve by which the intermittently acting valve may be cut out of the system and the traverse brought under manual control.

One of the features of the invention which is of application to grinding machines in general relates to mechanism for effecting the transverse movement of the work piece and grinding wheel first into operative relation and then for effecting the grinding feed. As herein shown, yielding means are provided tending at all times to swing the work piece toward the grinding wheel and an automatically acting cam is provided for timing the action of the yielding means.

The carriage herein disclosed and the novel mechanism for effecting the various movements of relative approach and separation of the carriage supporting the work piece and the grinding element are not herein claimed as they form the subject matter of my co-pending application Serial No. 287,203, filed June 21, 1928, which is a continuation of the present application as to all common subject matter.

These and other features of the invention will be best understood and appreciated from the following description of a preferred embodiment thereof, selected for purposes of illustration and shown in the accompanying drawings, in which Fig. 1 is a view in front elevation of the complete machine;

Fig. 2 is a view in end elevation, partly in section, on line 2—2 of Fig. 1 and on an enlarged scale;

Fig. 4 is a view in front elevation, on an enlarged scale, of the traverse controlling mechanism;

Fig. 5 is a view in elevation, partly in section, of the same mechanism viewed from the right in Fig. 4;

Fig. 6 is a plan view of the space bar shown in Fig. 4 and associated mechanism;

Figure 7:
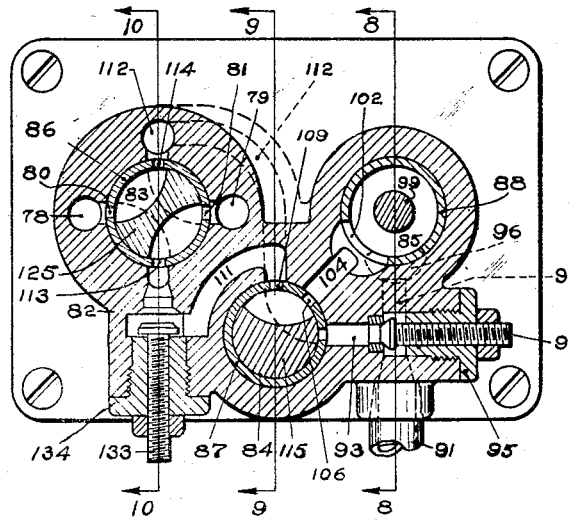
Fig. 7 is a sectional view of the controlling valves on the line 7—7 of Fig. 5.
Figure 8:
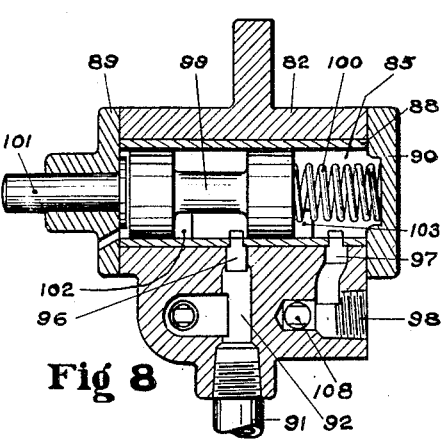
Figure 9:
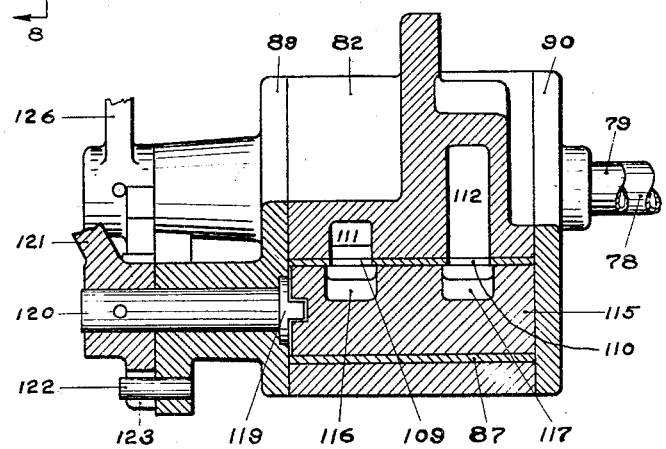
Figure 10:
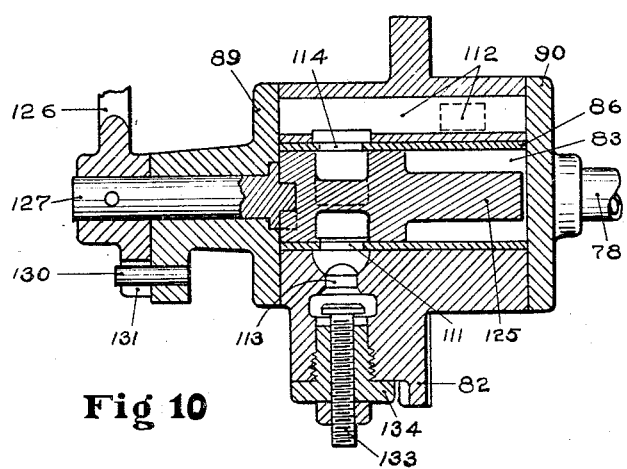
Figure 12:
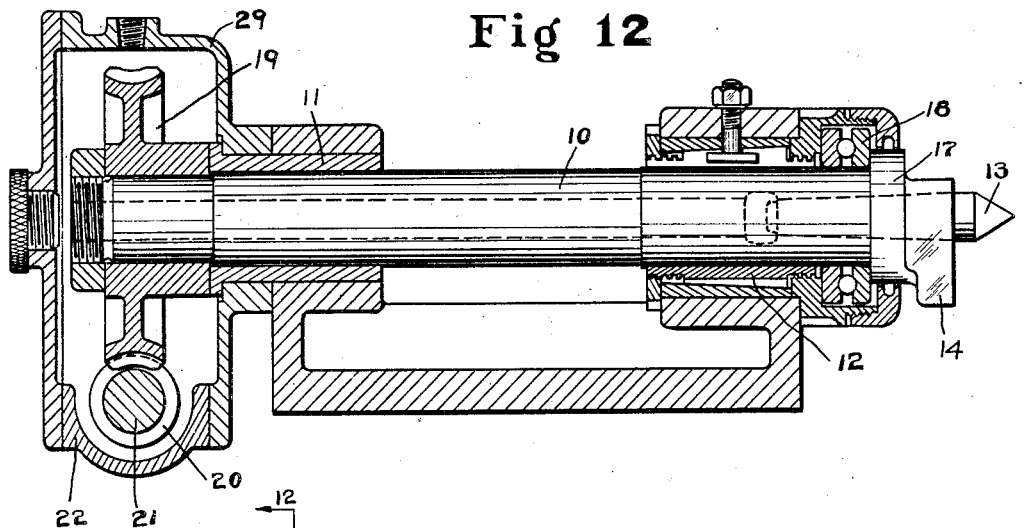
Figure 13:
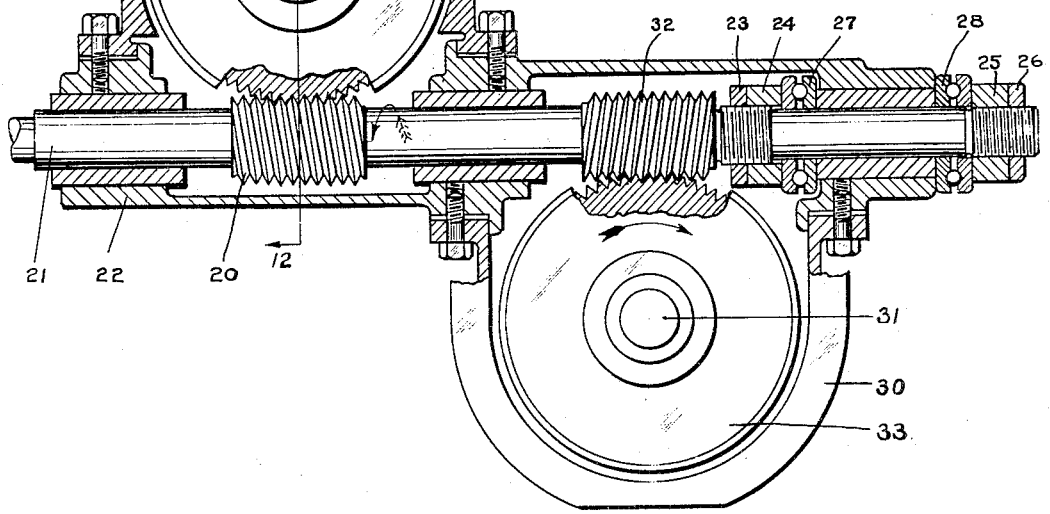

Figs. 8, 9 and 10 are sectional views taken respectively on the lines 8—8, 9—9 and 10—10 of Fig. 7;

Fig 11 is a diagrammatic view of the fluid pressure system for producing and controlling the traverse of the carriage;

Fig. 12 is a view in section, on an enlarged scale, of the work driving spindle on the line 12—12 of Fig. 13;

Fig. 13 is a view in section of the mechanism for driving the work and model shafts on line 13—13 of Fig. 1;

Fig. 14 is a sectional view of the starting lever and associated mechanism on line 14—14 of Fig. 5; and Fig. 15 is a view in perspective, on a reduced scale, of part of the timing mechanism.

The general organization of the machine will be first outlined so that the manner of its operation may be more easily followed, and a more detailed description will then be set forth.

The machine is illustrated, in Fig. 1, as set up to grind a cam shaft 16 of an automobile engine, having twelve cams 40 spaced longitudinally and unequally therein. The contour to be reproduced in the various individual cam blanks is derived from a series of spaced master or model cams 39 formed in a model shaft 31 located in parallel relation to the work shaft. Both the work shaft and the master shaft are mounted for rotation in a frame which is arranged to swing toward and from a grinding wheel 1. The movement of the work shaft toward and from the grinding wheel is controlled by the engagement of one of the model cams with a model cam roll or follower. The frame carrying the work shaft and the master shaft is mounted in a carriage which is movable longitudinally and automatically to present successive cam blanks in operative relation to the grinding wheel. All of the various mechanisms are so interrelated that the operation of the machine may be completely automatic after it has once been set in motion, but provision is made for operating the machine under partial manual control, if this should be preferred.

The grinding wheel 1 is mounted to be driven in any convenient manner and is also bodily movable transversely on the base 2 of the machine by means of a hand wheel 3 located within convenient reach of the operator. The mounting of the grinding wheel is not shown as it forms no part of the present invention and may be of any well-known commercial construction. It will be understood, however, that the transverse adjustment of the grinding wheel permits it to be advanced as it is worn away in use or in dressing and that such adjustment is of a preliminary nature to be effected prior to setting up the machine for any particular piece of work.

Proceeding now with the more detailed description: The base 2 of the machine comprises an elongated casing carrying longitudinally extending ways 5, the faces of which converge obliquely at an inclination of about 45 degrees, see Fig. 2. An elongated carriage slide 4 is supported in the ways and provided with a pivot bar 6, upon which is pivotally mounted an elongated carriage 7.

The carriage 7 carries work-supporting members comprising a foot-stock 8 and a head-stock 9, the latter having a driven work spindle rotatably mounted therein. Referring particularly to Fig. 12, it will be seen that the spindle 10 is supported in bearings 11 and 12 and carries a work-supporting center 13 and a driving arm or prong 14, adapted to engage a dog 15 or other driving device which may be clamped on the work shaft 16. The spindle 10 is secured against endwise movement in one direction by means of a shoulder 17 at its forward end and ball bearings 18, and in the other direction by the hub of a worm wheel 19 secured to its rear end. The forward bearing 12 is shown as provided with means for adjustment of a character well known in the art and requiring no description.

The worm wheel 19 is driven by a worm 20 on the shaft 21, rotatably mounted in a frame or casing 22. The shaft 21 is secured against endwise movement by a pair of adjustable collars 25 and 26 threaded upon its outer end and a second pair of adjustable collars 23 and 24 located within its forward bearing and serving to confine thrust bearings 27 and 28. The casing 22 is adjustably secured to a housing 29 mounted upon the head stock and a housing 30 mounted upon the frame 7, and carrying one bearing for the model or master shaft 31. A second worm 32 on the shaft 21 drives a worm wheel 33, secured to the outer end of the model shaft.

The two worms 20 and 32 are of equal lead but oppositely pitched and the worm wheels 19 and 33 have the same number of teeth. Accordingly, rotation of the worm shaft 21 drives the model shaft 31 and the spindle 10 in the same direction and at the same speed. It will be apparent that by moving endwise the worm shaft 21 with the attached worms 20 and 32, one worm wheel will be advanced and one retarded, thereby changing their angular relation or the timing of their rotation. This may be effected when desired by means of the adjustable collars 23—24 and 25—26 on the worm shaft 21.

The model shaft is rotatably mounted in a series of bearings in the carriage 7 and is removable and interchangeable for other shafts having differently shaped and arranged models formed therein. The left end of the model shaft is carried by a bearing formed in the housing 30 and other bearings 38 support the length of the model shaft against deflection while in operation.

The worm shaft 21 is driven by a pulley 34 which, as shown in Fig. 1, is secured to its rear end and connected by a belt 35 to a motor 36 mounted upon an extension 37 on the carriage 4 and having flexible leads so that it may travel back and forth in the reciprocation of the table.

Figure 3:
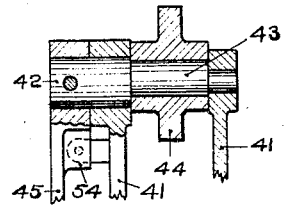
Fig. 3 is a sectional view on the line 3—3 of Fig. 2.

A bracket 41 is rigidly secured to the base 2 and has journaled in its upper end a shaft 42, having an eccentric portion 43, Fig. 3, upon which is rotatably mounted the model follower roll 44. A forwardly extending lever 45 is rigidly secured to the shaft 42 and pivotally connected to the upper end of a vertically disposed link 46 having at its lower end a cam roller 47 and guided for vertical motion by a link 48, pivotally connected to the bracket 41 by a stud 49 and to the vertical link 46 by a stud 50. The link 46 is moved upwardly by a cam 51, upon which the cam roll 47 rests, and downwardly by a spring 52, extending between an ear 175 on the bracket 41 and a corresponding ear 176 on the link 46. The downward movement of the link 46 is adjustably limited by means of a stop screw 53 set in an ear projecting from the bracket 41 and standing in the path of a projection 54 in the lever 45.

The cam 51 is secured to a longitudinally extending shaft 55 which is journaled at one end in the bracket 41 and at the other end in a housing 56 secured to the base 2. This shaft is rotated at the desired speed by means of a worm wheel 57 secured to its outer end and a worm 58 on a transverse shaft 59, Fig. 1. Any convenient source of power, such as an individual motor, may be utilized for driving the worm shaft 59. As herein shown, a driving shaft 62 is provided and change gears 60 and 61 are interposed between this and the worm shaft 59. The gear 60 and 61 may be interchanged, if desired, so that, the speed of rotation of the shaft 55 may be varied.

The bracket 41 is provided with a vertically moving plunger 63, carrying at its upper end a roller 64 adapted to engage an outwardly projecting portion 65 of the carriage 7 and to rock the frame upwardly at the proper point in the cycle of the machine until its motion is arrested by the contact of one of the model cams 39 with the model roll 44. The plunger 63 is moved upwardly by a compression spring 66, when such movement is permitted by controlling mechanism including a forked lever 69 which engages a pair of collars 68 threaded upon the lower end of the spindle. The opposite sides of the spindle are flatted and the forked lever 69 prevents it from turning. The lever 69 has a cam arm 70, carrying a cam roll 71 at its free end which runs upon the contour of a second cam 72 on the cam shaft 55. The cam 72 is shaped to hold the spindle 63 in its lower or inoperative position, as shown in Fig. 2, during approximately 90° of the revolution of the shaft 55. In this position of the spindle, the carriage 4 and carriage 7 are free to be moved longitudinally for feeding successive cam blanks in the work shaft into position opposite the grinding wheel 1.

Assuming that the carriage slide 4 has been moved to a position in the ways 5 to bring a cam blank 40 opposite the grinding wheel and a model 39 opposite the model roll 44 and that the work and model shafts are driven at the same speed, it will be apparent that in the rotation of the shaft 55 the cam roller 71 will drop off the cam 72, permitting the spindle 63 to swing the carriage 7 upwardly until the model roll 39 encounters the master roll 44, and will thereafter maintain the contour of the model cam 39 against the periphery of the model roll 44, swinging the carriage 7 back and forth about its pivot bar 6 and imparting an identical motion to the work shaft and the cam blanks therein.

In the movement of the work shaft heretofore described, the cam blanks are carried toward the grinding wheel 1 to a point such that each of them is just out of touch with the grinding wheel. The nearer approach of the cam blank to the grinding wheel or the grinding feed is brought about by bodily moving the model roll 44 so as to permit the carriage 7 to rock further toward the grinding wheel. This is effected by the action of the cam 51 which, in its rotation, permits the link 46 gradually to move downwardly, swinging the shaft 42 in a clockwise direction, as seen in Fig. 2, and carrying the eccentric journal portion 43 thereof upwardly. The master roll 44 is thereafter moved bodily upwardly until its travel is limited by the arm 54 coming in contact with the adjustable stop screw 53. When this point is reached, the grinding feed has progressed to a point at which the cam blank being ground is carried toward the grinding wheel sufficiently to insure its complete grinding to the required size. The continued rotation of the shaft 55 and the cams carried thereby causes the plunger 63 to be again depressed and the rocking carriage 7 returned to its initial angular position, as shown in Fig. 2, and the link 46 is again elevated by the cam 51, returning the work roll 44 also to its initial position. The carriage 4 is now free to be moved longitudinally another step to bring a new cam blank into operative position.

It will be apparent that the contours of the different blanks and their size are controlled by the contours and the sizes of the model cams. If the work blanks are cylindrical, as would be the case in grinding a series of bearings or collars on a shaft, the rotation of the model shaft is unnecessary and may be dispensed with.

The longitudinal or traversing movement of the carriage is effected by a fluid pressure system which will now be described. The carriage slide 4 is provided at its left end with an extension 37 to which is rigidly secured a downwardly extending arm 73. A piston rod 74 is secured to the arm 73 and extends into a cylinder 75 disposed longitudinally within the base 2. The piston rod carries at its inner end a piston 76 which is moved in one direction or the other by oil or other fluid admitted under pressure to one end or the other of the cylinder 75. Pipes 78 and 79 lead to opposite ends of the cylinder and act alternately as pressure and exhaust connections.

The admission of fluid under pressure to one end or the other of the cylinder is controlled by a series of interrelated valves, shown diagrammatically in Fig. 11 and in detail in Figs. 7 to 10, to which reference may now be had. The valves are formed in a main body or casting 82 and comprise three cylindrical chambers 83, 84 and 85 in which are tightly fitted sleeves 86, 87 and 88, the various ports being formed in the sleeves and communicating with passages formed in the body 82. The opposite ends of the valve chambers are closed by cover plates or heads 89 and 90.

Oil is admitted first to the right-hand valve 85 of the series through a supply pipe 91 connected with any convenient source of supply, such as a power pump 174. The pipe 91 communicates with an inlet passage 92 leading directly to the valve chamber 85 and having a branch 93 leading to the valve chamber 84. The effective area of the passage 93 may be restricted by a valve 94, Fig. 7, threaded into a valve cap 95 inserted in the valve body 82. The inlet port 96 of the valve chamber 85 is shown in Fig. 8, as is also the outlet port 102, the return inlet port 103 and the exhaust port 97 which communicates with an exhaust passage 98, by which the oil may be returned to the source of supply. The valve chamber 85 is provided with a balanced piston valve 99 which is normally held in open position by a compression spring 100, that is to say, the valve 99 is maintained in such position that oil under pressure entering through the inlet port 96 may pass directly through the outlet port 102. A plunger 101 is slidably mounted in the valve cover 89 and when the plunger 101 is depressed, the valve 99 is moved to close the outlet port 102 and establish communication between the inlet port 96 and the exhaust port 97. The valve 99 is used only in automatically starting and stopping the traverse movement of the carriage.

The course of the fluid through this valve in its passage to and from the cylinder 75 will now be described and the automatic valve operating mechanism will then be explained.

The valve chamber 85 is connected through the port 102 and a passage 104 with the port 106 of the valve chamber 84 and also through port 103 and passage 105 with the port 107 of the same chamber. The valve chamber 84 is provided with a passage 108, Fig. 11, connecting the said chamber directly with the exhaust outlet 98. The valve chamber 84 is also connected to the valve chamber 83 by means of aligned ports 109 and 110 communicating with passages 111 and 112 in the valve body 82 and leading to ports 113 and 114 in the valve chamber 83.

Within the valve chamber 84 is located a rocking valve 115 having two openings 116 and 117 formed therein, as shown in Fig. 9, which form connecting passages between the ports 109 and 106 and the ports 110 and 107 respectively when the valve occupies the full line position shown in Fig. 7. The valve 115 has a slot across its outer end which receives a projecting tongue 119 formed on the inner end of a shaft 120, rotatably journaled in the cover 89 and arranged to be rocked by means of a lever 121 secured to its outer end. The rocking movement of the valve 115 is limited by a pin 122 set in the cover 89 and projecting between two ears 123 and 124 projecting from the hub of the lever 121.

The valve 115 serves to cut the automatically acting valve 99 either into or out of the control system, rendering the grinding machine either automatic in its operation or under manual control. When in the full line position corresponding to the automatic control, as shown in Fig. 7, it closes the passages 93 and 108 so that flow of oil under pressure is through the valve chamber 85 and directly controlled by the valve 99. In this position of the valve, the lever 121 occupies its extreme left-hand position, as shown in Fig. 4, the projection 123 being in contact with the pin 122. When the lever 121 is swung toward the right, the valve 115 is moved into the dotted line position shown in Fig. 7, in which the passages 93 and 108 are opened to the ports 109 and 110 respectively and, by means to be hereinafter described, the power or flow controlling valve 99 is moved to its closed position in which it covers the ports 102 and 103. When the parts are in that position, the oil flows in through the passage 93 direct to the valve chamber 84, then out through the port 109 and the passage 111 and port 113 to the valve chamber 83. The valve 99 is, therefore, cut out of the system and the timing of the oil flow is under manual control, as will presently appear.

The valve chamber 83 is that directly controlling the direction of flow of fluid to the cylinder 75 and has oppositely disposed inlet ports 113 and 114. The passage 111 leads to the inlet port 113 from the valve chamber 84, and the passage 112 leads to the inlet port 114 from the port 109 of the valve chamber 84. The valve chamber is also provided with two oppositely disposed outlet ports 80 and 81 which communicate respectively with the pipes 78 and 79 leading to the cylinder.

A rocking valve 125 in the chamber 83 has a tongue and slot connection to the inner end of a shaft 127 journaled in the cover plate 89 and provided at its outer end with an operating lever 126, see Fig. 4 and Fig. 10. Movement of the valve is limited by a pin 130 set in the cover plate 89 and projecting between ears 131 and 132 on the hub of the lever 126.

When the valve 125 is in the full line position shown in Fig. 7, fluid entering through the port 113 is admitted directly to the port 81 and through the pipe 79 to the right-hand end of the cylinder 75 and the piston 76 is moved toward the left. The oil in the left-hand end of the cylinder flows out through the pipe 78 and connecting passage into the valve through the port 80, thence to the port 114 and out through the passage 112, the port 110 and the passage 108 to the exhaust outlet 98. When the valve 125 is rocked into the dotted line position shown in Fig. 7, the port 113 will be connected to the outlet port 80 and the oil will flow through the pipe 78 to the left-hand end of the cylinder 75. Oil remaining in the cylinder will flow out of its right-hand end and into the valve through the port 81, thence to the port 114 and out through the exhaust outlet, as already explained. It will be apparent, therefore, that the purpose of the valve 125 is to reverse the direction of flow of oil to the carriage operating cylinder. Inasmuch as this valve may be set by hand in its middle position, wherein it stops all flow of oil, it also serves as a manually operated valve for controlling the time of fluid flow and consequently the traverse movement of the carriage in either direction.

When the machine is operating under automatic control, the rate of oil flow may be controlled by means of a valve 133 (Figs. 7 and 10) arranged in the passage 111 and threaded into a valve cap 134 secured in the valve body 82. The rate of movement of carriage traverse is thus regulated in accordance with the requirements of the work in hand.

From the foregoing description, the interrelation of the three valves and their connections to the cylinder 75 will be apparent. The reversing valve 125 in chamber 83, controlled by the lever 126, is operated manually only. In its extreme positions, it controls the direction of flow to the cylinder and therefore the direction of carriage traverse. In its intermediate position, it closes off the pipes 78 and 79 communicating with the cylinder and hydraulically locks the piston 76, and therefore the carriage, in stationary position.

The valve 115 in the chamber 84 is also operated manually only and determines whether the flow of oil to the valve chamber 83 is by way of the valve chamber 85 or not. The valve 115 is operated by the lever 121 and when in its left-hand position, as shown in Fig. 4, the by-pass passages 93 and 108 are closed and the flow of oil through the valve system is by way of the valve chamber 85 and thence unimpeded through the valve chamber 84 to the reversing valve chamber 83. When the lever 121 is swung to its right-hand position, the by-pass passages 93 and 108 are opened, establishing direct communication between the valve chamber 84 and the inlet passage 92 and the exhaust passage 98 of the system, and at the same time the passages 104 and 105 leading from the valve chamber 85 are closed. The valve chamber 85 is, therefore, completely cut out of the system and the traverse of the carriage is subject to manual control through the lever 126 and valve 125.

The valve 99 in the chamber 85 is operated automatically and intermittently in the normal automatic operation of the machine, being moved by the plunger 101 from the position shown in Fig. 8, wherein the inlet port 102 and the return port 103 are open so that the oil is flowing to and from the cylinder 75, to a position in which the ports 102 and 103 are closed and the piston locked in stationary position under hydraulic pressure. The rate of flow, and therefore the travel of the carriage, is, under these circumstances, controlled by the setting of the valve 133 in the inlet passage of the valve chamber 83.

When the machine is operating under manual control, it is desirable to limit the speed of carriage traverse to a slower rate than when under automatic control. The valve 94 which is located in the inlet passage 93 to the valve chamber 84 may be used for this purpose. As the oil does not flow through the passage 93 when the machine is operating under automatic control, the valve 94 will have no effect on the rate of fluid flow in the system except when under manual control.

The mechanism for operating the flow controlling valve 99 will now be described. The shaft 55, already referred to as controlling the movement of the carriage in approaching and receding from the grinding wheel, carries also a cam 135, see Figs. 4 and 5, upon the periphery of which runs a follower roll 136 mounted in a vertically disposed cam lever 137 pivoted at its upper end upon a shaft 138, mounted in a bracket 139 secured to the base 2. Near its lower end, the cam lever 137 is provided with a bearing piece 140 which bears against the outer end of the plunger 101 of the valve 99 and, when the high portion of the cam 135 is acting, depresses the plunger and moves the valve 99 to its closed position. When the cam 135 rotates to a position wherein a short radius portion is acting upon the follower roll, as in Fig. 5, the compression spring 100 under the valve 99 will act to move the valve to its open position and swing the lever 137 outwardly, maintaining the roller 136 in contact with its periphery. When this occurs, the traverse movement of the table begins. This movement would be positively stopped when the cam 135 in its rotation again moves the valve to its closed position but, in order to obtain traverse movements of different extent at any desired portion of the carriage movement, separate and additional means distinct from the cams 135 are provided for rocking the lever 137 to close the valve 99.

It should be noted that the cam 135 is so timed with respect to the cam 72 on the same shaft that the valve 99 is held positively in its closed position while the cam 72 permits the carriage to be swung toward the grinding wheel. This locks the carriage against traverse movement while there is any possibility of interference between the work and the grinding wheel. On the other hand, the cam 72 permits the approaching movement of the work to the grinding wheel only when the cam 135 occupies its valve closing position.

To this end, the carriage is provided with a controlling member movable therewith and having valve operating stations or stopping devices spaced in predetermined relation to the blanks of the work piece. This member comprises a space bar 141 secured to the carriage 4 at its forward edge and having thereon a series of tripping projections 142. It will be understood that the space bar 141 is removable and interchangeable for similar bars having projections arranged to correspond to the particular character of the work in hand. The projections 142 act to rock a vertically disposed lever 146. This lever is pivoted on a stud 147 in the bracket 139 and urged inwardly at its upper end by a tension spring 148 connected between its lower arm and the bracket 139. At its upper end, the lever 146 carries a horizontally extending arm 144 which is pivoted on the stud 145. The lever 146 has an inwardly extending forked projection, the branches of which extend on either side of the arm 144 and in which are mounted adjustable stop screws 156 and 157. Lost motion of the arm 144 takes place between these stop screws as the roll 143 is engaged by one of the projections 142. When the lost motion of the arm 144 is arrested in either direction by encountering one of the stops, the projection 142 acts to displace the arm 144 bodily and forwardly, as seen in Fig. 6, rocking the lower end of the lever 146 inwardly.

The valve operating lever 137 has a forwardly projecting arm 155 secured to it which is provided with a shoulder 154. Pivotally connected to the lower end of the lever 146 is a forwardly extending arm 150, to the outer end of which is attached a plate 151, Fig. 5. The plate 151 is adapted to rest upon a cam 152 on the shaft 55 and has a laterally projecting hook 153 adapted to engage the shoulder 154 of the arm 155. When the continued movement of the carriage forward brings a projection 142 into engagement with the roller 143 and swings the lever 146, the arm 150, through the connections described, pulls the cam operating lever 137 inwardly and closes the valve 99, thus arresting the traverse of the carriage. The parts are shown in this position in Figs. 5 and 6.

The rotation of the cam shaft 55 and the cam 135 will start the traverse movement of the table by permitting the valve 99 to open and the traverse movement of the carriage will continue while the space bar 141 is moved through the distance between the two projections 142. In the illustrated case, these are unequally spaced corresponding to the unequal spacing of the blanks in the work piece. When the next projection 142 comes in contact with the roller 143, the valve 99 will be again closed. The continued rotation of the shaft 55 will again bring the high part of the cam 135 into action so that the valve 99 will be held closed. The cam 152, however, will then act to lift the plate 151 and the hook 153 out of the path of movement of the shoulder 154 so that as rotation of the shaft 55 continues, the valve 99 will be permitted to open without interference. Immediately after the valve has opened, the cam 152 will recede from the plate 151 so that upon the movement of the carriage 4 and the return of the arm 150 and the arm 151 to the position shown in Fig. 5, the hook 153 will again be in position to engage the shoulder 154 and close the valve 99 when the next projection 142 on the space bar arrives in actuating position.

It will be apparent that the mechanism above described is effective to control the movement of the carriage 4 in either direction. Accordingly, the work piece may be moved from left to right or from right to left in its traverse to present successive blanks to the grinding wheel.

It is desirable to terminate automatically further traverse of the carriage in either direction after the carriage has been moved into position for grinding the last blank of the series on the work piece. To this end, the space bar 141 is provided at either end in suitable position with downwardly extending projections 158 and 159 adapted to engage one arm 160 of a horizontally disposed lever pivotally mounted upon the bracket 139. The outwardly projecting arm 162 of the lever is provided with a segment plate 163, Fig. 14, having a finger 164 arranged normally in the path of movement of a blade 165 projecting from a vertically disposed lever 166. The lever 166 is pivoted on the stud 168 extending between ears formed in the bracket 139 and is normally urged inwardly at its upper end by a tension spring 167 by which it is connected to the arm 162 of the lever above mentioned.

The lever 166 has at its lower end an inwardly extending arm 169 to which is attached a latch plate 170 which is normally out of the path of movement of the arm 155 on the valve operating lever 137. However, when either of the stops 158 or 159 acts, moving the finger 164 out of the path of the blade 165, the lever 166 will be rocked inwardly by the spring 167 so that the latch plate 170 will interlock with a recess 171 in the arm 155, holding the valve operating lever 137 in its valve closing position. The machine will, therefore, remain at rest until the operator pulls the lever 166 outwardly again, having, if desired, set the lever 126 to reverse movement of the carriage.

The valve operating lever 137 has at its lower end a projecting pin 172, which is so located with reference to a cam projection 173 on the lever 121 that when lever 121 is moved into position for the manual control of the carriage traverse, the valve operating lever 137 is swung positively inwardly to its valve closing position, thus rendering the automatic control inoperative. On the other hand, when the lever 121 is swung into the position for automatic control, the movement of the lever 137 is in no way restricted thereby.

The operation of the machine will be understood from the foregoing description but may be briefly summarized as follows. The work piece having longitudinally spaced blanks to be ground is mounted in the carriage and a space bar 141 with correspondingly arranged projections is secured in place upon the carriage and the latter moved to bring one end of the work piece opposite the grinding wheel 1. The reversing lever 126 is then set in accordance with the direction desired for the carriage traverse and the lever 121 is set for automatic control. The motor 36 is started, rotating the work piece and the model or master shaft. The cam shaft 55 is set in rotation, and the rocking movement of the carriage begins to occur idly, as none of the blanks of the work piece has yet been brought into operative position with respect to the grinding wheel. The operator then starts the carriage traverse by swinging the starting lever 166 forwardly, tripping the latch plate 170 from the arm 155 and allowing the valve operating lever 137 to move outwardly and the valve 99 to open. The parts are shown in this condition in the diagram of Fig. 11. Traversing movement of the carriage at once begins and continues until the first projection 142 of the space bar acts, through the connections above described, to swing the lever 137 again into valve closing position. The carriage then remains at rest while it is rocked in the grinding feed movement and the first blank is ground to correspond in contour with the first model cam. When the grinding operation is completed and the work moved outwardly away from the grinding wheel, the cam 152 acts at the proper time in the cycle of the machine to disengage the hook 153 from the shoulder 154 so that the valve operating lever may again be swung outwardly and permit the valve 99 to open for the second traversing step of the carriage. This sequence of operations continues until the last cam blank of the series has been ground and the stop 158 or 159 acts to bring the carriage to rest.

If the speed of the carriage traverse is too slow to be terminated by action of a tripping projection 142 on the space bar before the cam 72 would act to initiate the approaching movement of the work and grinding wheel, then the cam 135 acts positively to close the valve and stop the traverse. In point of time, therefore, whichever of the two stopping devices, the cam 135 or a projection 142, reaches operative position first is the one which terminates the carriage traverse. It will be apparent that in this way overlapping of the two movements of the carriage is positively prevented. If the carriage traverse is too slow to allow tripping by a projection 142, the speed controlling valve 133 may be opened to increase the rate of oil flow through the system and, consequently, the rate of traverse.

If it is desired to operate the machine under manual control, the sequence of operations may be the same but the lever 121 will be moved to its right-hand position, cutting out the time controlling valve 99 and locking the lever 137 in its initial position. The traversing movement of the carriage is then controlled by the operator, who will swing the reversing lever 126 intermittently from its central position, wherein the carriage is locked stationary, to one extreme position or the other, in which case movement of the carriage takes place in one direction or the other, as desired. Ordinarily, when the carriage traverse is brought under manual control, the cam shaft 55 will be brought to rest by stopping its driving motor. The operator may then with safety traverse the carriage to try the position of the different blanks in operative position or for any other purpose.

The work piece has been referred to as having spaced blanks to be ground. These blanks may be cam blanks, as shown in the accompanying drawings, or they may be ring bearings, crank pins or any other portion of a work piece which it is desired to grind into conformity to a symmetrical or unsymmetrical model, and it will be understood that a cam shaft has been shown in the drawings for purposes of illustration alone.

In certain of the accompanying claims, for convenience in expression, the carriage and work pieces are referred to as being movable with respect to the grinding element. It will be understood that it is of only secondary importance which element actually moves and that any relative movement of the two is within the scope of the claims. The term carriage also is used to designate all of the work carrying and supporting organization of the machine or the rocking frame 8 which is a part of it.

Having thus described my invention, what I claim as new and desire to secure by Letters Patent is:

1. A grinding machine comprising a grinding element, a carriage for supporting a work piece having a series of spaced blanks therein, fluid pressure mechanism including a piston operatively connected to said carriage, valve means for admitting fluid under pressure to one side of the piston for moving the carriage to present successive blanks to the grinding element and a valve control device including dogs on the carriage connected to operate the valve to stop the carriage and a mechanism connected to move the valve after a predetermined time interval to start the carriage.

2. A grinding machine comprising a grinding element, a carriage for supporting a work piece having a series of spaced blanks therein, a fluid pressure system for traversing said carriage including a cylinder, a manually operable flow reversing valve, and a separate valve automatically actuated by said carriage movement for controlling the time of flow in the system.

3. In a grinding machine having a carriage for supporting a work piece having spaced blanks therein, a grinding wheel operatively associated therewith, a fluid pressure system for traversing said carriage including a cylinder, a flow reversing valve, a flow controlling valve, automatic means for intermittently actuating the latter valve to position said blanks successively opposite to the grinding wheel, and a manually controlled valve for cutting said flow-controlling valve out of the system and bringing the flow therein under manual control.

4. In a grinding machine having a carriage for supporting a work piece with spaced blanks therein, a grinding element, cam controlled means for relatively moving the carriage and grinding element for effecting the grinding feed, a fluid pressure system for traversing said carriage including a cylinder, a valve for timing the fluid flow in the system arranged to be automatically closed to arrest the carriage traverse at predetermined points in the travel thereof, and a cam for effecting the opening of the valve in timed relation to the grinding feed movement.

5. A grinding machine comprising a grinding element, a carriage for supporting a work piece with unequally spaced blanks therein, automatically acting mechanism for relatively and longitudinally moving the work piece and grinding element through unequal predetermined distances in either direction to present successively the unequally spaced blanks in grinding position, including a stop arranged to be selectively operated after a predetermined interval of time or by the movement of the carriage to a predetermined point, and means for relatively moving the work piece and grinding element transversely to grind each blank as presented.

6. A grinding machine comprising a grinding element, a carriage for supporting a work piece with unequally spaced blanks therein, automatically acting mechanism for longitudinally moving the work piece in either direction in a predetermined number of unequal steps to present successive blanks in grinding position, and means for stopping such longitudinal movement after a predetermined number of unequal steps.

7. A grinding machine comprising a grinding element, a carriage for supporting a work piece with spaced blanks therein, means tending at all times to move the work piece toward the grinding element constructed and arranged to be constrained during predetermined intervals, whereby the work piece is free to occupy a position remote from the grinding element, means for moving the carriage longitudinally timed to operate in said intervals to present successive blanks in grinding position, and a control device including dogs on the carriage connected to stop the carriage and mechanism connected to start the carriage again after a predetermined time interval.

8. In a grinding machine having a grinding element, a carriage for supporting a work piece with spaced blanks therein, carriage-actuating means for traversing the carriage to present successive blanks to the grinding element, automatic mechanism for controlling said carriage-actuating means, manually operated mechanism for controlling said carriage-actuating means, and separate speed regulating devices for controlling the traverse of the carriage when under automatic control and when under manual control.

9. In a grinding machine having a grinding element, a carriage for supporting a work piece with spaced blanks therein, automatic mechanism for traversing said carriage by predetermined steps in either direction to present successive blanks in grinding position beginning at either end of the work piece, and adjustable means for regulating the speed of such traversing steps.

10. A grinding machine having a grinding wheel, a carriage for supporting a work piece with spaced blanks therein, means for traversing the carriage to present the blanks consecutively in grinding position, actuating means for causing relative approach of the carriage and grinding wheel, and an automatically actuated cam mechanism arranged to positively lock said actuating means out of action during the carriage traversing operation.

11. A grinding machine having a grinding wheel, a carriage for supporting a work piece with spaced blanks therein, actuating means for causing intermittent relative approach of the carriage and grinding wheel to effect a grinding operation on each of the successive blanks, and actuating means for traversing the carriage in either direction to present the blanks one by one in grinding position, and an automatically actuated cam mechanism arranged to positively lock said actuating means out of action during each grinding operation.

12. A grinding machine having a grinding wheel, a carriage for supporting a work piece with spaced blanks therein, actuating means for traversing the carriage to present the blanks one by one in grinding position, actuating means for causing intermittent relative approach of the carriage and grinding wheel to effect a grinding operation in each blank thus presented, and a shaft having cams for controlling the time of operation of said two actuating means and preventing overlapping thereof.

13. In a grinding machine having a carriage for supporting a work piece with spaced blanks therein, actuating means for intermittently traversing said carriage to present successive blanks in grinding position, a controlling device operated by the traverse of the carriage for determining the length of each traverse step, and separate positively acting means for limiting each traverse step independently of the carriage movement.

14. In a grinding machine having a carriage for supporting a work piece with spaced blanks therein, a grinding element, automatically acting means for alternately traversing the carriage and then moving it toward and away from the grinding element to present and grind successive blanks, a controlling device operated by the carriage for variably determining the length of each traverse step, and separate positively acting means for stopping each traverse step prior to the grinding feed movement of the carriage.

15. In a grinding machine having a carriage for supporting a work piece with spaced blanks therein, a fluid pressure system for traversing said carriage including a cylinder, a valve for controlling cut-off of flow arranged to be closed intermittently by the movement of the carriage into successive positions, and separate mechanism for closing said valve at a predetermined point in the cycle of the machine independently of the traverse position of the carriage.

16. In a grinding machine having a carriage for supporting a work piece with unequally spaced blanks therein, a grinding element, automatically acting mechanism for moving said carriage and grinding element toward and from each other at regular intervals, a fluid pressure system, including a cylinder, for traversing said carriage, a valve timed to open to initiate a traverse step each time the carriage and grinding element are separated, mechanism operated by the carriage for closing the valve and thus variably determining the length of the traverse steps in accordance with the unequal spacing of the blanks, and mechanism operating independently of the carriage for closing said valve in all cases before the carriage again begins to approach the grinding element.

17. In a grinding machine having a carriage for supporting an elongated work piece, actuating means for traversing the carriage to present successive portions of the work in grinding position, an automatically acting controlling device for intermittently rendering said actuating means effective to traverse the carriage in a step-by-step manner, and automatic means for latching the controlling device in inoperative position when the end of the work arrives in grinding position.

18. In a grinding machine having a carriage for supporting an elongated work piece, a fluid pressure system for traversing said carriage, an intermittently acting valve for controlling fluid flow in the system to effect a step-by-step traverse of the carriage, and automatic means for latching said valve in closed position when the end of the work arrives in grinding position.

19. In a grinding machine having a grinding element, a carriage for supporting a work piece with spaced blanks thereon, automatic mechanism for intermittently traversing said carriage by predetermined steps in either direction to present successive blanks in grinding position beginning at either end of the work piece, and means to stop the carriage after it has been traversed through a predetermined number of steps.

20. A grinding machine comprising a rotary grinding wheel, means for supporting a rotating work piece having a plurality of blanks thereon, means for moving the work support transversely towards and from the wheel to control the contour of the work, means for impressing a secondary motion upon the work support to grind the work to a predetermined extent, and means operating in timed relation with said transverse movement for relatively moving said wheel and work piece longitudinally through a succession of predetermined distances, whereby a plurality of blanks may be successively and automatically ground to predetermined dimensions and desired shapes.

21. A grinding machine comprising a rotary grinding wheel, means for supporting a rotating work piece having a plurality of blanks thereon, means including a master cam and follower to move the work transversely toward and from the wheel to control the contour of the work piece, means acting during the grinding operation to impart a secondary motion to the work and move it towards the wheel to grind it to a predetermined size, and mechanism operating in timed relation with the work feeding movement for relatively moving the grinding wheel and work piece longitudinally to position a second blank in operative relation to the grinding wheel.

22. A grinding machine comprising a grinding element, a carriage for supporting a work piece having a series of spaced blanks therein, means to traverse said carriage by predetermined steps in either direction to present successive blanks in grinding position, and a control device including dogs on the carriage connected to stop the carriage, and an automatic mechanism connected to start the carriage again after a predetermined time interval.

23. A grinding machine comprising a grinding element, a carriage for supporting a work piece having a series of spaced blanks therein, fluid pressure means including a piston operatively connected to said carriage, valve means for admitting fluid under pressure to one side of the piston for moving the carriage to present successive blanks to the grinding element, and a valve control device including dogs on the carriage and a valve locking device connected to move the valve to and hold it in a closed position to stop the carriage, and a continuously operated cam mechanism connected to release the valve and move it to an open position.

Signed at Worcester, Massachusetts, this 18th day of May, 1928.

WARREN F. FRASER.